June 6, 1972  W. H. STOKEY  3,667,768
HOLDER FOR SPADE DRILL
Filed April 9, 1970  2 Sheets-Sheet 2

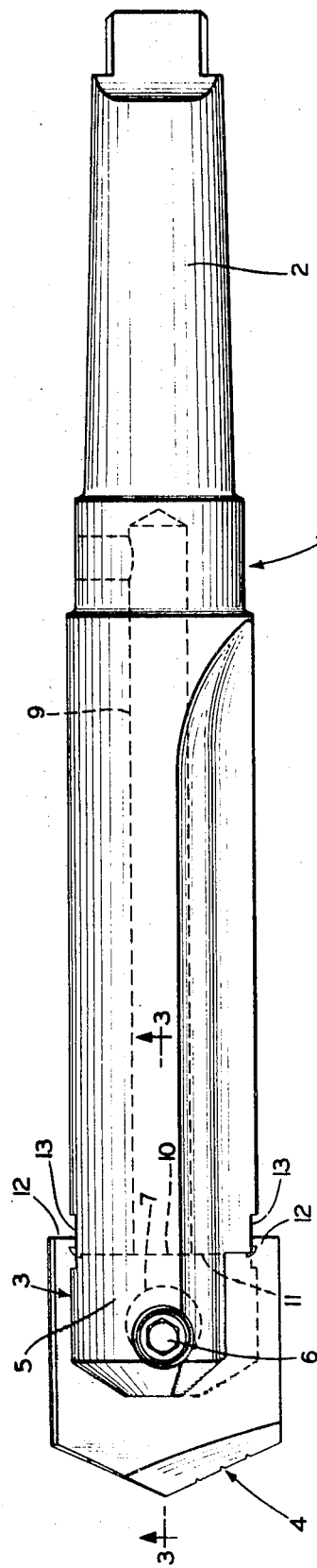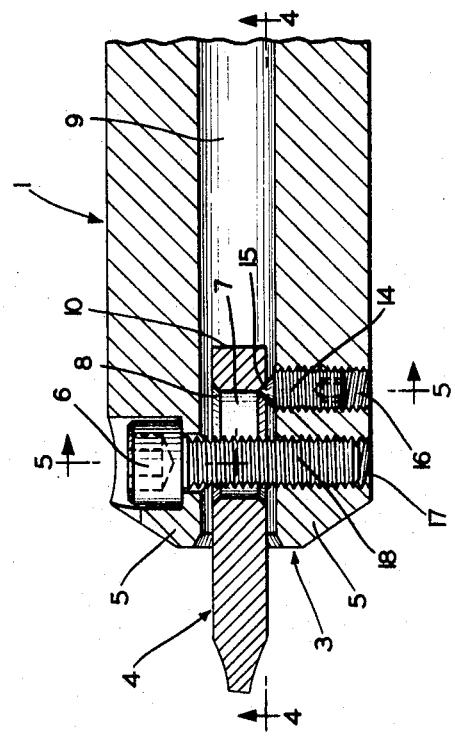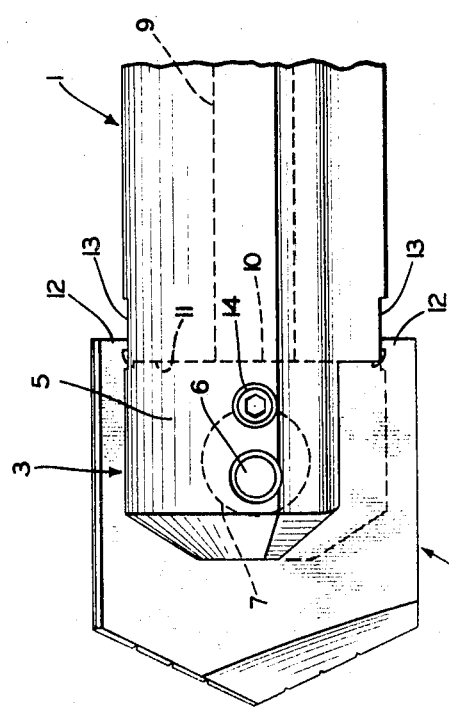

INVENTOR.
William H. Stokey
BY
Frease & Bishop
ATTORNEYS

United States Patent Office 3,667,768
Patented June 6, 1972

3,667,768
HOLDER FOR SPADE DRILL
William H. Stokey, Cleveland, Ohio, assignor to Allied Machine & Engineering Corporation, Cleveland, Ohio
Filed Apr. 9, 1970, Ser. No. 26,839
Int. Cl. B23b 27/16
U.S. Cl. 279—83         5 Claims

ABSTRACT OF THE DISCLOSURE

A holder for a spade drill. The holder has the usual bifurcated end for receiving the spade drill and the usual clamping screw located through the bifurcated end of the holder and through the usual relatively large aperture in the spade drill for frictionally clamping the spade drill between the furcations of the holder. A setscrew with conical end is located through a diametrically disposed tapped opening in one of the furcations, the conical end of the setscrew being received in the aperture in the blade drill, in contact with the usual bevelled edge at the rear side of said aperture, for holding the blade drill against accidental movement in the holder.

BACKGROUND OF THE INVENTION

(1) Field of the invention

The invention relates to holders for spade drills and more particularly to a holder having means for drawing a spade drill into properly located position in the holder and positively holding it in such position during operation of the drill and during withdrawal thereof from the workpiece.

(2) Description of the prior art

All holders for spade drills of which applicant has knowledge depend upon a clamping screw located through aligned apertures in the bifurcated end of the holder and through the usual aperture in the spade drill, of larger size than said screw, for clamping the furcations of the holder against opposite sides of the spade drill.

Such holders depend entirely upon friction for holding the spade drill properly located in the holder. During operation of a spade drill in such a holder, and especially when withdrawing the spade drill from the workpiece, it often happens that the spade drill is pulled out of proper location in the holder, which may result in breaking of one of the locater lugs at the back edge of the spade drill or in damaging the workpiece or both.

It is not known that any spade drill holder produced prior to applicant's invention is provided with any positive means for moving a spade drill into a properly located position in the holder and positively holding it in such properly located position.

SUMMARY OF THE INVENTION

In general terms, the invention may be briefly described as comprising a holder for a spade drill, formed from a steel bar provided at one end with a shank for fitting into the chuck of a drill press or the like, the other end of said holder being bifurcated to receive a spade drill as in conventional practice.

The usual clamping screw is located through the bifurcated end of the holder and through the customary relatively large aperture in the spade drill. This much of the holder construction is conventional.

The invention consists of a conical-ended setscrew located through a tapped aperture in one furcation of the holder, the conical end of the screw contacting the bevelled rear edge of the customary relatively large aperture in the spade drill, drawing the spade drill into properly located position in the holder and positively holding it in this position.

It is, therefore, an object of the invention to provide a holder for a spade drill having means for positively holding the spade drill in properly located position therein.

Another object of the invention is to provide a spade drill holder of this character having means for moving the spade drill into properly located position within the bifurcated end of the holder.

A further object of the invention is to provide such a spade drill holder in which a setscrew with a conical end is threaded through a tapped opening in one of the furcations in such location as to engage the bevelled edge at the rear side of the opening in the spade drill.

These and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings.

BRIEF DESCRIPTION OF THE DRAWINGS

FIG. 1 is a top elevation of a holder embodying the invention with a spade drill therein;

FIG. 2 is an enlarged fragmentary bottom elevation of the holder with the spade drill therein;

FIG. 3 is a fragmentary longitudinal section on the line 3—3, FIG. 1;

DESCRIPTION OF THE PREFERRED EMBODIMENT

Figure 4:
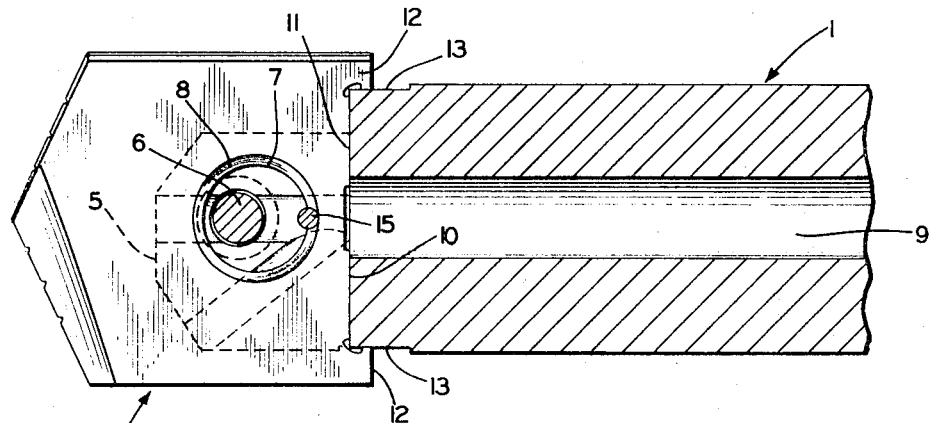
FIG. 4 is a fragmentary longitudinal section through the bifurcated end of the holder showing the spade drill in elevation, taken on the line 4—4, FIG. 3.

Referring now more particularly to the embodiment of the invention illustrated in which similar numerals refer to similar parts throughout, a holder for spade drills is indicated generally at 1.

The holder is formed from a steel bar and has a shank 2 at one end adapted to be inserted into the chuck of a drill press or the like and the other end is bifurcated, as indicated generally at 3. As in usual practice, a spade drill, as indicated generally at 4, is adapted to be received between the furcations 5.

Also, as in usual practice, a clamping screw 6 is located through both furcations 5 and adapted to be received in the customary aperture 7 of the spade drill. As in conventional practice, the aperture 7 is considerably larger than the diameter of the clamping screw 6, and has beveled edges 8.

A central longitudinal opening 9 is provided in the holder 1 for supplying coolant liquid to the spade drill as is customary in such holders. This much of the holder is old and well known and in general use.

The difficulty encountered with the use of such holders is that there is no positive means for holding the spade drill 4 properly located in the bifurcated end 3 of the holder with the rear edge 10 of the spade drill held tightly against the inner wall 11 of the groove between the furcations 5.

The clamping screw 6 is the only means in the customary spade drill holder for holding the spade drill therein, and this depends entirely upon friction of the two opposed faces of the furcation 5 against opposite surfaces of the spade drill.

Since the aperture 7 in the spade drill shown in 4 is of greater diameter than the clamping screw 6, there is no positive means in the ordinary holder for drawing the rear edge 10 of the spade drill against the inner wall 11 of the groove and positively holding the spade drill in this position with the locater lugs 12 of the spade drill contacting the opposite surfaces 13 of the two furcations.

In using this conventional type of holder, particularly when withdrawing the drill from a hole drilled in a workpiece, it frequently happens that the spade drill is accidentally moved outward relative to the holder, moving the rear edge 10 thereof away from the inner wall 11 of the groove in the holder so that the spade drill may pivot relative to the holder resulting in damage to the spade drill, such as breaking of one of the locater lugs 12 and/or damage to the workpiece, or both.

The present invention comprises the provision of a setscrew 14 with conical end 15 in one furcation 5 of the holder for the purpose of drawing the spade drill back into proper location as shown in FIG. 4 with its rear edge 10 contacting the inner wall 11 of the groove and its two locater lugs 12 engaging opposite side surfaces 13 of the furcations 5.

The setscrew 14 is threaded into a tapped aperture 16 in longitudinal alignment with the tapped aperture 17 which receives the threaded portion 18 of the screw 6.

The conical end 15 of the setscrew 14 engages the bevelled edge 8 at the back end of the aperture 7 so as to move the spade drill back to the position shown in FIG. 4 and positively hold it in this position during operation and particularly when the drill is withdrawn from the hole it has bored.

Figure 5:
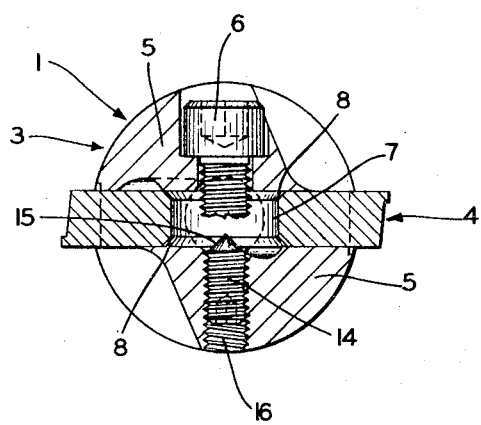
FIG. 5 is a transverse section through the holder at the setscrew, taken on the line 5—5, FIG. 3.

With this construction the holder does not depend upon the clamping action of the clamping screw 6 alone to hold the spade drill 4 properly located in the bifurcated end portion of the holder but has the positive means of the setscrew 14 with conical end 15 which extends into the aperture 7 of the spade drill in contact with the bevelled edge 8 at the rear side of the aperture 7 positively holding the back edge 10 of the spade drill 4 against the inner wall 11 of the groove between the furcations 5 which receives the spade drill. This is shown quite clearly in FIGS. 3, 4 and 5.

It would be necessary to shear the end of the setscrew 14 entirely off before the spade drill 4 could move out of proper located position, and this would not be at all probable under ordinary working conditions.

Figure 6:
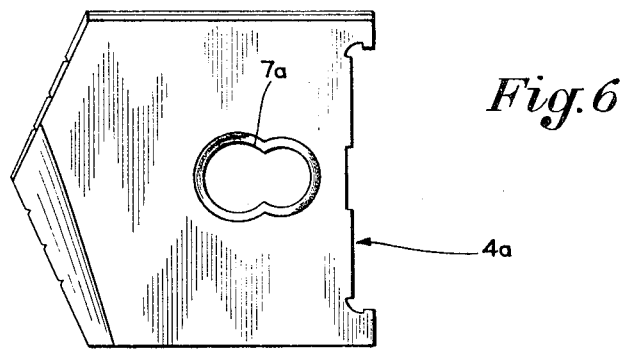
FIG. 6 is an elevation of a spade drill with double aperture therein.

It is general practice to manufacture spade drills, such as indicated generally at 4, with a central aperture 7, as best shown in FIG. 4, of considerably larger diameter than the clamping screw 6, or like the spade drill generally indicated at 4a in FIG. 6 having a double aperture indicated generally at 7a.

The length of the double aperture 7a is the same as diameter of the aperture 7. The reason that the opening 7 or 7a in spade drills is so much larger than the clamping screw 6 of the holder is because different manufacturers place the clamping screw 6 at slightly different locations in the bifurcated end of the holder and all spade drills manufactured by anyone either as shown at 4 or 4a are made so that they will fit any holder made by any of the several manufacturers of spade drill holders.

From the above it will be obvious that the present invention provides a spade drill holder of simple construciton which has positive means for not only drawing a spade drill into properly located position in the bifurcated end of the holder but for positively holding it in such position during operation of the drill and withdrawal thereof from the workpiece, a shear action being necessary to accidentally dislodge the same.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construcion.

Having now described the invention or discovery, the construction, the operation, and use of the preferred embodiment thereof, and the advantageous, new and useful results obtained thereby; the new and useful construction, and reasonable mechanical equivalents thereof obvious to those skilled in the art, are set forth in the disclosure.

I claim:

1. A spade drill holder comprising a steel bar having one end portion bifurcated to receive a spade drill having an aperture therethrough with a bevelled edge, clamping screw means of considerably less diameter than the aperture in the spade drill located through said bifurcated end portion and through said aperture, the invention comprising positive means separate from said clamping screw means engaging the rear edge of said aperture for holding the spade drill properly located in said bifurcated end portion.

2. A spade drill holder as defined in claim 1 in which said positive means is screw means.

3. A spade drill holder as defined in claim 2 in which said screw means has a conical end engaging the bevelled edge of said aperture in the spade drill.

4. A spade drill holder as defined in claim 3 in which said screw means is a setscrew located in a tapped opening in one furcation of said bifurcated end portion.

5. A spade drill holder as defined in claim 1 in which the aperture in the spade drill is about twice the diameter of the clamping screw means.

References Cited

UNITED STATES PATENTS

| | | | |
|---|---|---|---|
| 1,047,466 | 12/1912 | Wagner | 279—86 X |
| 387,475 | 8/1888 | Whaling | 279—83 X |
| 692,755 | 2/1902 | Aylmer | 279—97 |
| 1,851,261 | 3/1932 | Pechacek | 279—97 |
| 1,884,182 | 10/1932 | Pearce et al. | 279—97 |
| 1,132,375 | 3/1915 | Myers | 279—86 X |
| 1,064,618 | 6/1913 | Craig | 279—97 |

ANDREW R. JUHASZ, Primary Examiner

J. F. COAN, Assistant Examiner

U.S. Cl. X.R.

279—86; 408—239